A. J. COOK.
VEHICLE ATTACHMENT.
APPLICATION FILED OCT. 17, 1914.

1,143,751.

Patented June 22, 1915.

Witnesses
Oscar V. Payne
A. J. Hilid

Inventor
A. J. Cook
By Watson E. Coleman
Attorney

UNITED STATES PATENT OFFICE.

AARON J. COOK, OF GLOSTER, MISSISSIPPI.

VEHICLE ATTACHMENT.

1,143,751.  Specification of Letters Patent.  Patented June 22, 1915.

Application filed October 17, 1914. Serial No. 867,174.

*To all whom it may concern:*

Be it known that I, AARON J. COOK, a citizen of the United States, residing at Gloster, in the county of Amite and State of Mississippi, have invented certain new and useful Improvements in Vehicle Attachments, of which the following is a specification, reference being had to the accompanying drawings.

This invention relates to an improved vehicle attachment, and has for its primary object to provide a simply constructed, reliable, and durable device for application to motor vehicles to prevent rattling of the parts of the steering mechanism and the axle truss rods when the vehicle is traveling over a rough grade surface.

In its more specific aspect, the present invention provides a series of rods and means for readily attaching the same to the steering arms of the motor vehicle, and tension springs connected to said rods at one of their ends and having their other ends suitably fixed to the chassis of the machine or to the engine bed plate.

It is a further object of my invention to produce a device of the above character which may be easily and quickly applied to the vehicle without necessitating any alterations in its construction, or removed therefrom, and is highly serviceable and convenient in the prevention of excessive noise and undue wear upon the parts of the vehicle construction.

Figure 1:
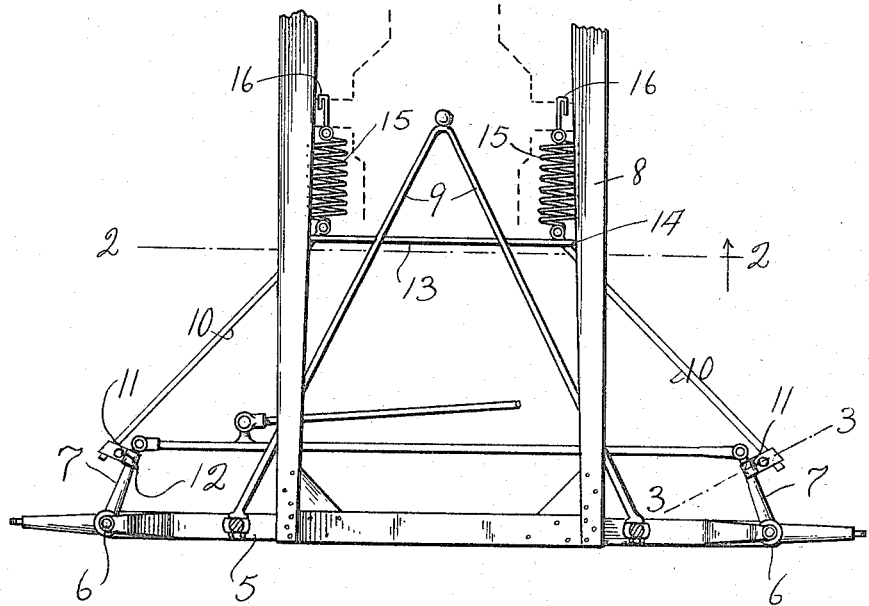
Figure 2:
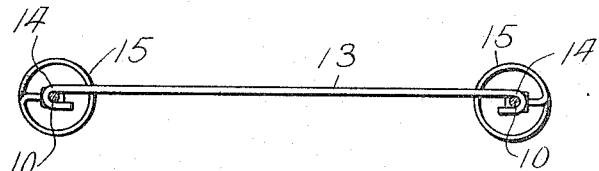
Figure 3:
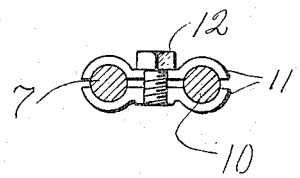

With the above and other objects in view, my invention consists in the novel features of construction, combination, and arrangement of parts to be hereinafter more fully described, claimed, and illustrated in the accompanying drawing, in which, Figure 1 is a plan view of the forward end portion of the chassis of a motor vehicle showing the application of my invention thereto; Fig. 2 is an enlarged section taken on the line 2—2 of Fig. 1; and Fig. 3 is a detail section taken on the line 3—3 of Fig. 1.

Referring in detail to the drawing, 5 designates the front wheel axle of an automobile upon the ends of which the usual steering knuckles indicated at 6 are provided, each of said knuckles being equipped with a rearwardly extending arm 7.

8 designates the frame or chassis upon which the body of the vehicle is mounted in the usual manner. The diverging radius rods 9 are connected at their forward ends to the wheel axle 5 and have their rear integrally connected ends suitably mounted in a socket or in any other approved manner upon the engine case.

My invention, which I will presently set forth in detail, is particularly designed for application to the Ford automobile, although it will be understood that by resorting to obvious mechanical alterations, in the arrangement or construction of the several parts, the device might also be rendered adaptable to machines of other make.

In the practical development of my invention, I employ the rearwardly extending convergently related rods 10, the forward ends of which are securely clamped and held between the spaced plates indicated at 11. These plates are also engaged upon the ends of the steering arms 7 and are immovably clamped in position by means of a suitable clamping bolt indicated at 12 which extends through central openings in said plates. The rear ends of the rods 10 are connected by means of a transverse rod 13, the ends of which are provided with loops or hooks 14 through which the respective rods 10 extend. To the rear ends of the rods 10, the forward ends of the heavy coil springs 15 are secured. The rear ends of these springs are equipped with hooks shown at 16 which are adapted to be engaged over the rear edge of the engine bed. These springs normally act to exert a rearward longitudinal pull upon the rods 10 and thereby prevent a vertical movement of the steering rod which connects the arms 7 and thus hold the same out of contact with the radius rods 9. In this manner, it will be understood that rattling or noise incident to the contact of the parts with each other in the movement of the machine over rough roads, is obviated, and the durability of the steering mechanism enhanced thereby. It will be understood that instead of providing the terminal hooks 16 on the springs for connecting the same to the bed plate of the engine, the rear ends of said springs may be securely bolted to the side bars of the frame or chassis 8.

From the foregoing description, taken in connection with the accompanying drawing, the construction, manner of operation, and several advantages of my invention, will be clearly and fully understood. While the device is exceedingly simple, it is, at the same time, highly efficient for the purposes in view. It is to be noted that no alterations of any character whatsoever are required in the construction of the ordinary automobile, in order to enable my improved attachment to be applied thereto. The device may also be readily arranged in operative position upon the machine without necessitating the employment of the skilled mechanic.

While I have above described the preferred construction and arrangement of the several elements employed, it is to be understood that the device is susceptible of considerable modification therein, and I therefore reserve the privilege of resorting to all such legitimate changes as may be fairly embodied within the spirit and scope of the invention as claimed.

Having thus fully described my invention, what I desire to claim and secure by Letters Patent, is:—

1. The combination with a motor vehicle steering mechanism including steering arms, rearwardly extending rods connected at their forward ends to said arms, and coil springs fixed at one of their ends and connected at their other ends to said rods to normally exert a rearward pull upon the same, substantially as and for the purposes set forth.

2. The combination with an automobile steering mechanism including steering arms, of rods connected at their forward ends to said arms, a transverse rod connecting said first named rods at their rear ends, and coil springs secured at their forward ends to said first named rods and provided with means upon their rear ends for engagement with the bed plate of the vehicle engine.

3. The combination with the steering mechanism of an automobile including steering arms, of rearwardly converging rods clamped at their forward ends to said arms, a transverse rod connecting said converging rods at their rear ends, coil springs connected at one of their ends to the rear ends of said converging rods and normally exerting a rearward pull upon the same, and hooks on the rear ends of said springs engaged upon the bed plate of the vehicle engine.

In testimony whereof I hereunto affix my signature in the presence of two witnesses.

AARON J. COOK.

Witnesses:
C. D. McLean,
T. J. Brud.